United States Patent
Rho et al.

(10) Patent No.: US 10,476,046 B2
(45) Date of Patent: Nov. 12, 2019

(54) FLEXIBLE BATTERY

(71) Applicant: AMOGREENTECH CO., LTD., Gyeonggi-do (KR)

(72) Inventors: Seung Yun Rho, Gyeonggi-do (KR); Won Gil Choi, Gyeonggi-do (KR); Hyeon Woo Cho, Chungcheongnam-do (KR); Ju Hee Jang, Gyeonggi-do (KR); Hyeong Tak Noh, Seoul (KR)

(73) Assignee: AMORGREENTECH CO., LTD., Gyeonggi-do (KR)

( * ) Notice: Subject to any disclaimer, the term of this patent is extended or adjusted under 35 U.S.C. 154(b) by 262 days.

(21) Appl. No.: 15/527,234

(22) PCT Filed: Nov. 17, 2015

(86) PCT No.: PCT/KR2015/012332
§ 371 (c)(1),
(2) Date: May 16, 2017

(87) PCT Pub. No.: WO2016/080728
PCT Pub. Date: May 26, 2016

(65) Prior Publication Data
US 2017/0338449 A1    Nov. 23, 2017

(30) Foreign Application Priority Data

Nov. 17, 2014    (KR) .................. 10-2014-0160349

(51) Int. Cl.
*H01M 10/04*    (2006.01)
*H01M 10/058*   (2010.01)
(Continued)

(52) U.S. Cl.
CPC ....... *H01M 2/0275* (2013.01); *H01M 2/0207* (2013.01); *H01M 2/162* (2013.01);
(Continued)

(58) Field of Classification Search
None
See application file for complete search history.

(56) References Cited

U.S. PATENT DOCUMENTS

| 2009/0067119 A1* | 3/2009 | Katayama ............... H01G 9/02 361/523 |
| 2012/0107657 A1* | 5/2012 | Kwon ................. H01M 2/1094 429/94 |

(Continued)

FOREIGN PATENT DOCUMENTS

| JP | H076771 A * | 1/1995 | ............. H01M 2/02 |
| JP | 2000-173559 A | 6/2000 | |

(Continued)

OTHER PUBLICATIONS

JPH076771A—Machine translation (Year: 1995).*

(Continued)

*Primary Examiner* — Miriam Stagg
*Assistant Examiner* — Haroon S. Sheikh
(74) *Attorney, Agent, or Firm* — Masuvalley & Partners (57) ABSTRACT

A flexible battery is provided. A flexible battery according to an exemplary embodiment of the present invention comprises: an electrode assembly; and an exterior material for encapsulating the electrode assembly together with an electrolyte, wherein the exterior material includes a first pattern part and a second pattern part for contraction and relaxation at the time of bending, which are formed on at least one surface of the exterior material, and the first pattern part and the second pattern part have different patterns.

8 Claims, 6 Drawing Sheets

(51) Int. Cl.
  *H01M 2/02* (2006.01)
  *H01M 2/16* (2006.01)
  *H01G 11/78* (2013.01)
  *H01M 10/0585* (2010.01)

(52) U.S. Cl.
  CPC ......... *H01M 2/1686* (2013.01); *H01M 10/04* (2013.01); *H01M 10/0436* (2013.01); *H01M 10/058* (2013.01); *H01G 11/78* (2013.01); *H01M 10/0585* (2013.01); *H01M 2220/30* (2013.01)

(56) References Cited

U.S. PATENT DOCUMENTS

2013/0101884 A1\* 4/2013 Ueda .................. H01M 10/052
    429/127

2016/0079576 A1\* 3/2016 Lim .................... H01M 2/0292
    429/176

FOREIGN PATENT DOCUMENTS

| JP | 2005-317525 A | 11/2005 |
| JP | 2006-172773 A | 6/2006 |
| KR | 10-2010-0000655 A | 1/2010 |
| KR | 10-1382554 B1 | 4/2014 |
| WO | 2012/140709 A1 | 10/2012 |

OTHER PUBLICATIONS

International Search Authority/KR, International Search Report dated Mar. 21, 2016 in International Patent Application No. PCT/KR2015/012332 (with English translation), 4 pages.

\* cited by examiner

FLEXIBLE BATTERY

RELATED APPLICATIONS

This application is a U.S. National Phase application under 35 U.S.C. § 371 of International Patent Application No. PCT/KR2015/012332 filed Nov. 17, 2015, which claims priority to Korean Patent Application No. 10-2014-0160349 filed Nov. 17, 2014, which are hereby expressly incorporated by reference in their entirety for all purposes.

TECHNICAL FIELD

The present disclosure relates to a flexible battery, and more particularly, to a flexible battery capable of preventing a crack from being generated due to distortion through a protection pattern.

BACKGROUND ART

As demand of a consumer has changed resulting from digitization and high performance of electronic products, a market demand is also changing to development of a power supply device with high capacity due to a thin profile, weight reduction, and high energy density.

To meet such demand of the consumer, a power supply device, which includes a lithium-ion secondary battery, a lithium-ion polymer battery, a supercapacitor (for example, an electric double layer capacitor and a pseudo capacitor), and the like which have high energy density and large capacity, is being developed.

In recent years, demand for mobile electronic devices including a portable telephone, a notebook computer, a digital camera, and the like is continuously increasing, and particularly, interest in a flexible mobile electronic device, to which a roll-type display, a flexible e-paper, a flexible liquid crystal display (LCD), a flexible organic light-emitting diode (OLED), and the like are applied, is increasing. Consequently, it is also needed for a power supply device for the flexible mobile electronic device to have a flexible characteristic.

As one of power supply devices capable of having such a flexible characteristic, a flexible battery is being developed.

The flexible battery may include a nickel-cadmium battery, a nickel-metal hydride battery, a nickel-hydrogen battery, a lithium-ion battery, and the like which have a flexible characteristic. Particularly, since the lithium-ion battery has high energy density per unit weight and is able to be rapidly charged compared to other batteries including a lead storage battery, a nickel-cadmium battery, a nickel-hydrogen battery, a nickel-zinc battery, and the like, it has high availability.

The lithium-ion battery employs a liquid electrolyte, and is mainly used in the form of a welded metal can as a vessel. However, since a cylindrical lithium-ion battery using a metal can as a vessel is fixed in form, there is a disadvantage in which an electrical product has limitation in design and further difficulty in reduction of a volume thereof.

Specifically, as described above, since the mobile electronic device is developed to be flexible as well as to have a thin profile and miniaturization, there is a problem in that a conventional lithium-ion battery using a metal can or a battery of a square-shaped structure is not easy to be applied to the mobile electronic device.

Therefore, to address the structural problem as described above, a pouch type battery, in which electrolyte is put into a pouch including two electrodes and a separator and then is sealed and used, is recently being developed.

There is an advantage in which such a pouch type battery may be manufactured with material having flexibility to be made in various forms, and may implement high energy density per weight.

Figure 1:
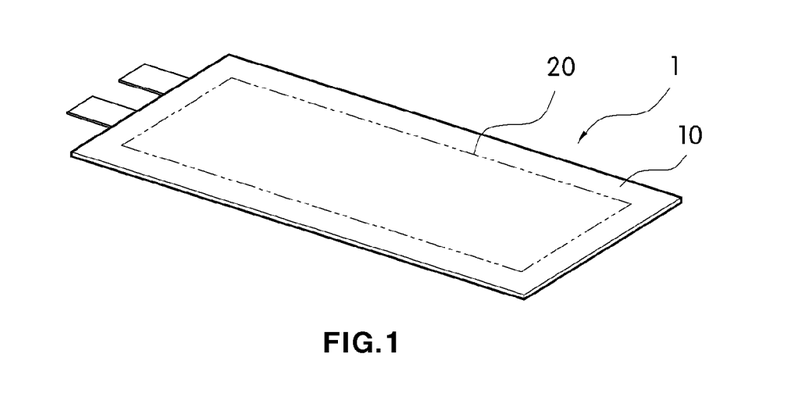
FIG. 1 is a schematic diagram illustrating a conventional battery.
Figure 2:
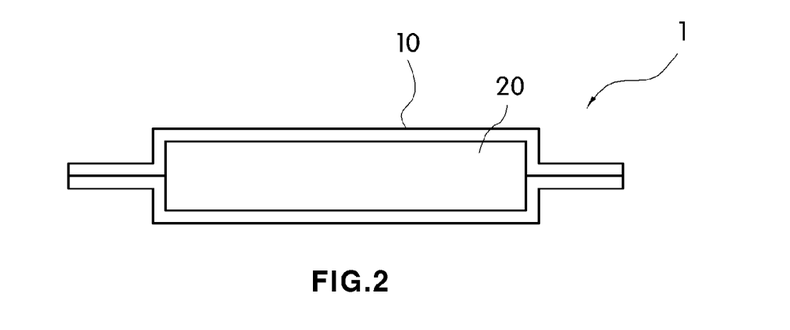
FIG. 2 is a cross-sectional view of FIG. 1.

That is, as shown in FIG. 1, a pouch type battery 1 is provided in a form in which an electrode assembly 20 is encapsulated inside an exterior material 10, and the exterior material 10 has a structure in which an inner resin layer, a metal layer, and an outer resin layer are stacked. The metal layer among these layers is an essential component of the exterior material for the purpose of a moisture proof and the like, and it serves to prevent moisture from penetrating from an outside of the exterior material into an inside thereof and at the same time to block electrolyte, which is located the inside of the exterior material, from leaking to the outside of the exterior material, since density of the metal layer is dense and thus the moisture and the electrolyte could not pass the metal layer.

Such a metal layer, however, has an insufficient elastic restoration force and thus it is difficult to secure flexibility over a predetermined level so that there is a problem in that a crack is caused when the metal layer is repeatedly bent.

Moreover, when the flexible battery is wound more than a single turn, distortion occurs at a portion exceeding the single turn and thus a crack of the flexible battery is caused so that there is limitation to manufacturing a flexible battery exceeding a predetermined length.

DISCLOSURE

Technical Problem

An object of the present disclosure is to provide a flexible battery capable of preventing a crack from being generated due to distortion by providing a pattern for contraction and relaxation against a direction of the distortion.

Technical Solution

To address the above described problem, the present disclosure provides a flexible battery including an electrode assembly; and an exterior material having a pattern for contraction and relaxation, which is formed on at least one surface of the exterior material and configured to encapsulate the electrode assembly together with electrolyte, wherein at least a portion of the pattern includes a pattern for contraction and relaxation against a distortion direction of the exterior material.

Also, the pattern may include a first pattern part for contraction and relaxation against a length direction of the exterior material when the flexible battery is bent and a second pattern part for contraction and relaxation against the distortion direction of the exterior material, and the first pattern part and the second pattern part may be provided in a different direction with each other.

Also, a mountain part and a valley part of each of the first pattern part and the second pattern part may be formed to be repeatedly disposed along the length direction of the exterior material, the mountain part and the valley part of the first pattern part may be formed to be in parallel with a straight line which is in parallel with a width direction of the exterior material, and the mountain part and the valley part of the second pattern part may be formed to be inclined by a predetermined angle with respect to the straight line which is in parallel with the width direction of the exterior material.

Also, the second pattern part may be formed to be inclined in a direction the same as that in which the exterior material is distorted.

Also, the second pattern part may be disposed to connect to the first pattern parts which are respectively formed at a different position with each other.

Also, adjacent mountain parts or valley parts of the second pattern part may be formed to be in parallel with each other.

Also, a gap between adjacent mountain parts or valley parts of the second pattern part may be formed to be gradually wider from one end to the other end.

Also, the electrode assembly may include a cathode in which a cathode active material is disposed at one surface or both surfaces of a cathode current collector, an anode in which an anode active material is disposed at one surface or both surfaces of an anode current collector, and a separator, and the cathode, the anode, and the separator may be respectively provided with a pattern the same as the pattern of the exterior material for contraction and relaxation.

Also, the separator may include a nanofiber web layer containing a polyacrylonitrile nanofiber at one surface or both surfaces of a nonwoven fabric layer.

Also, the pattern may be formed to be continuous or discontinuous, and may include one or more among a prism pattern, a half-circle pattern, a wavy pattern, a polygonal pattern, an embossed pattern, and a mixed pattern thereof.

Also, a soft housing configured to cover a surface of the exterior material may be included, wherein the soft housing may be provided with at least one terminal part configured to electrically connect to an external device.

Also, the pattern may be entirely or partially formed at a surface of the exterior material.

Meanwhile, the present disclosure provides a flexible battery including an electrode assembly; and an exterior material having a pattern, which is formed on at least one surface of the exterior material and in which a mountain part and a valley part are repeatedly disposed along a length direction of the exterior material, for contraction and relaxation when the flexible battery is bent, and configured to encapsulate the electrode assembly together with electrolyte, wherein the pattern includes a first pattern part for contraction and relaxation against the length direction of the exterior material when the flexible battery is bent and a second pattern part for contraction and relaxation against a distortion direction of the exterior material, and a mountain part and a valley part of the first pattern part are formed to be in parallel with a straight line which is in parallel with a width direction of the exterior material, and a mountain part and a valley part of the second pattern part are formed to be inclined by a predetermined angle with respect to the straight line which is in parallel with the width direction of the exterior material, thereby being provided in a direction the same as that in which the exterior material is distorted.

Advantageous Effects

In accordance with the present disclosure, a crack may be prevented from being generated due to distortion by providing a pattern for contraction and relaxation against a direction in which an exterior material is distorted such that an entire length may be increased.

MODES OF THE INVENTION

Hereinafter, embodiments of the present disclosure will be fully described in a detail which is suitable for implementation by those skilled in the art with reference to the accompanying drawings. The present disclosure may be implemented in various different forms, and thus it is not limited to embodiments to be described herein. In the drawings, some portions not related to the description will be omitted and not be shown in order to clearly describe the present disclosure, and the same reference numerals are given to the same or similar components throughout the disclosure.

Figure 3:
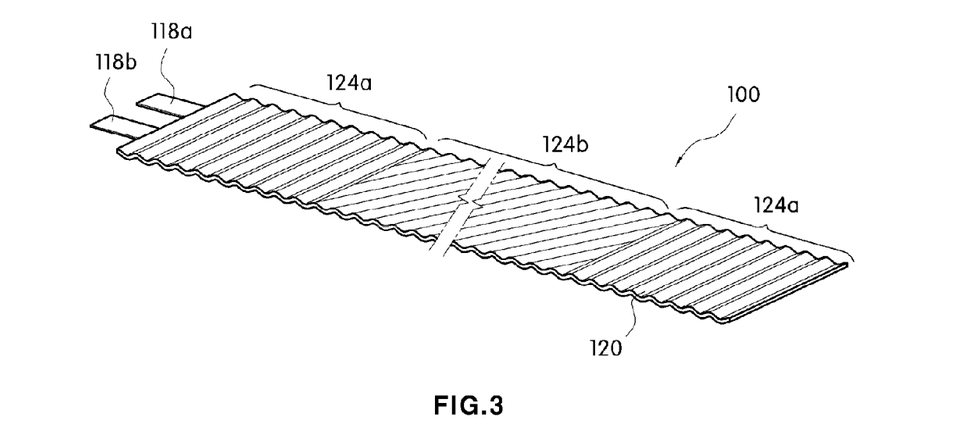
FIG. 3 is a perspective view illustrating a flexible battery according to one embodiment of the present disclosure.
Figure 9:
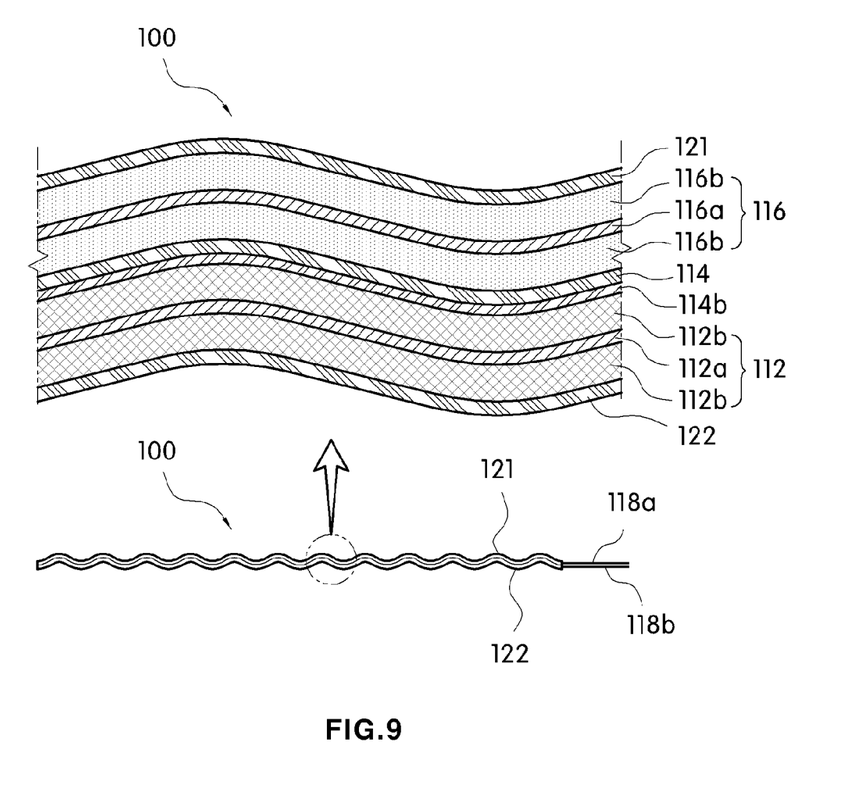
FIG. 9 is an enlarged cross-sectional view illustrating a detailed configuration of the electrode assembly applied to the flexible battery according to one embodiment of the present disclosure.

A flexible battery 100 according to one embodiment of the present disclosure includes an electrode assembly 110 and an exterior material 120, as shown in FIGS. 3 and 9.

As shown in FIG. 9, the electrode assembly 110 is encapsulated inside the exterior material 120 together with electrolyte, and may have a form in which a separator 114 is disposed between a cathode 112 and an anode 116.

The cathode 112 may include a cathode current collector 112a and a cathode active material 112b, the anode 116 may include an anode current collector 116a and an anode active material 116b, and the cathode 112 or the anode 116 is encapsulated by the separator 114 and thus is integrated therewith.

Here, an anode terminal 118a and a cathode terminal 118b, which respectively extend from a body, may be respectively formed at the anode current collector 116a and the cathode current collector 112a.

At this point, the separator 114 may include a nonwoven fabric layer 114a and a nanofiber web layer 114b provided at one side or both sides of the nonwoven fabric layer 114a.

Here, the nanofiber web layer 114b may be a nanofiber which contains one or more kinds selected from a polyacrylonitrile nanofiber and a polyvinylidene fluoride nanofiber.

Preferably, to secure radioactivity and uniform pore formation while the nanofiber web layer 114b is formed, the nanofiber web layer 114b may be configured with only the polyacrylonitrile nanofiber. Further, the polyacrylonitrile nanofiber of the nanofiber web layer 114b may have an average diameter in the range of 0.1 to 2 micrometers (μm), and preferably, 0.1 to 1.0 μm.

This is because that, when the average diameter of the polyacrylonitrile nanofiber is less than 0.1 μm, there is a problem in that a separator may not sufficiently secure thermal resistance, and further, when the average diameter of the polyacrylonitrile nanofiber exceeds 2 μm, there is a problem in that a mechanical strength of the separator may be superior but an elastic force thereof may be reduced.

Also, when a gel polymer electrolyte is used as the electrolyte, a composite porous separation membrane may be used as the separator 114 so as to optimize impregnation of the gel polymer electrolyte.

That is, the composite porous separation membrane may be used as a matrix, and may include a porous nonwoven fabric having fine pores and a porous nanofiber web formed with a polymer material, which is radioactivable, and impregnating the electrolyte.

Meanwhile, a nonwoven fabric configuring the nonwoven fabric layer 114a may be configured with one or more kinds selected from cellulose, cellulose acetate, polyvinyl alcohol (PVA), polysulfone, polyimide, polyetherimide, polyamide, polyethylene oxide (PEO), polyethylene (PE), polypropylene (PP), polyethylene terephthalate (PET), polyurethane (PU), poly(methyl methacrylate) (PMMA), and polyacrylonitrile.

Here, the nonwoven fabric layer may further include an inorganic additive, and the inorganic additive may include one or more kinds selected from SiO, SnO, $SnO_2$, $PbO_2$, ZnO, $P_2O_5$, CuO, MoO, $V_2O_5$, $B_2O_3$, $Si_3N_4$, $CeO_2$, $Mn_3O_4$, $Sn_2P_2O_7$, $Sn_2B_2O_5$, $Sn_2BPO_6$, $TiO_2$, $BaTiO_3$, $Li_2O$, LiF, LiOH, $Li_3N$, BaO, $Na_2O$, $Li_2CO_3$, $CaCO_3$, $LiAlO_2$, $SiO_2$, $Al_2O_3$, and polytetrafluoroethylene (PTFE).

Further, an average particle diameter of an inorganic particle, which is the inorganic additive, may be in the range of 10 to 50 nanometers (nm), and preferably, 10 to 30 nm, and more preferably, 10 to 20 nm.

Also, an average thickness of the separator may be in the range of 10 to 100 μm, and preferably, 10 to 50 μm. This is because that, when the average thickness of the separator is less than 10 μm, since the separator is too thin, it may be difficult to secure long-term durability of the separator due to repetitive bending and/or spreading of a battery, and, when the average thickness of the separator exceeds 100 μm, it is disadvantageous in thickness reducing of a flexible battery and thus it is preferable that the average thickness is in the above described range.

Further, an average thickness of the nonwoven fabric layer may be in the range of 10 to 30 μm, and preferably, 15 to 30 μm, and the nanofiber web layer may be preferable to have an average thickness in the range of 1 to 5 μm.

The cathode current collector and/or the anode current collector may be made of a thin-shaped metal foil, may be formed in a band shape having a predetermined length, and may be configured with a metal foil which is manufactured with copper, aluminum, stainless steel, nickel, titanium, chrome, manganese, iron, cobalt, zinc, molybdenum, tungsten, silver, gold, and a combination thereof.

The cathode active material may include a cathode active material capable of reversibly intercalating and deintercalating a lithium ion, and a representative example of such a cathode active material may use a lithium transition metal oxide including $LiCoO_2$, $LiNiO_2$, $LiMnO_2$, $LiMn_2O_4$, or $LiNi1-x-yCoxMyO_2$ ($0 \leq x \leq 1$, $0 \leq y \leq 1$, $0 \leq x+y \leq 1$, M is metal including Al, Sr, Mg, La, and the like). In the present disclosure, however, in addition to the cathode active material as described above, other kinds of cathode active materials may be also used.

Further, the anode active material 116b may include an anode active material capable of intercalating and deintercalating a lithium ion, and it may be selected from a group consisting of a carbon anode active material of crystalline or amorphous carbon, a carbon fiber, or a carbon composite, a tin oxide, lithiation thereof, lithium, a lithium alloy, and a mixture thereof. However, the present disclosure is not limited to the kinds of the anode active materials as described above.

Meanwhile, the cathode active material 112b and the anode active material 116b may contain a PTFE component. This is because of preventing the cathode active material 112b and the anode active material 116b from being respectively delaminated from the current collectors 112a and 116b, or preventing a crack from being generated when the cathode active material 112b and the anode active material 116b are bent.

The exterior material 120 is made of a plate-shaped member having a predetermined area, and accommodates thereinside the electrode assembly 110 and the electrolyte so as to protect the electrode assembly 110 from an external force.

For this purpose, the exterior material 120 is configured with a pair of a first exterior material 121 and a second exterior material 122, and is encapsulated along edges of the pair of the first exterior material 121 and the second exterior material 122 through an adhesive such that the electrolyte and the electrode assembly 110, which are accommodated inside the exterior material 120, are prevented from being exposed to the outside and from leaking thereto.

It is noted that such an exterior material 120 may be configured with two members as the first exterior material 121 and the second exterior material 122 and then edges abutting each other of the first exterior material 121 and the second exterior material 122 may be encapsulated through an adhesive, and otherwise, it may be configured with a single member, may be folded in half along a width direction or a length direction, and then portions abutting each other of the single member may be encapsulated through an adhesive.

Figure 4:
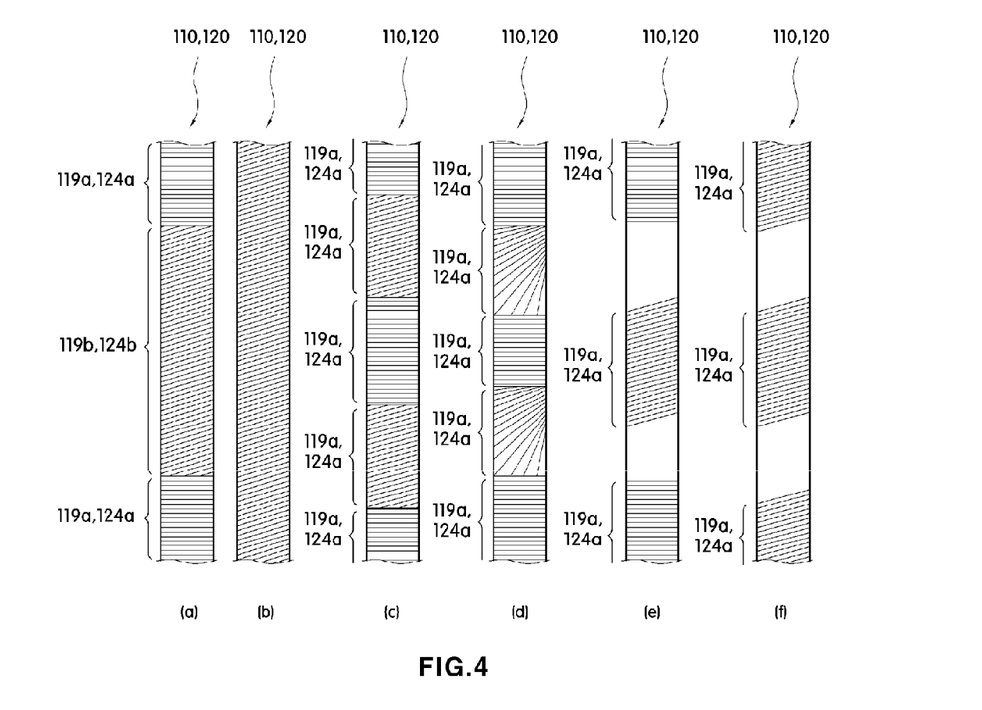
FIG. 4 is a schematic diagram illustrating various patterns applied to an electrode assembly and an exterior material in the flexible battery according to one embodiment of the present disclosure.
Figure 5:
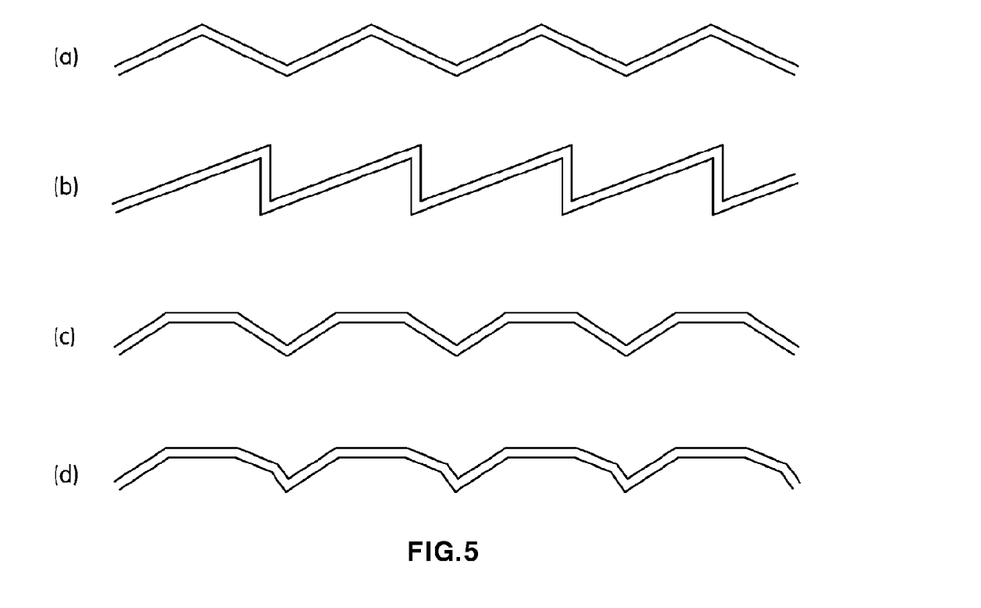
FIGS. 5 to 8 are schematic diagrams illustrating various shapes of patterns applied to the flexible battery according to one embodiment of the present disclosure.
Figure 6:
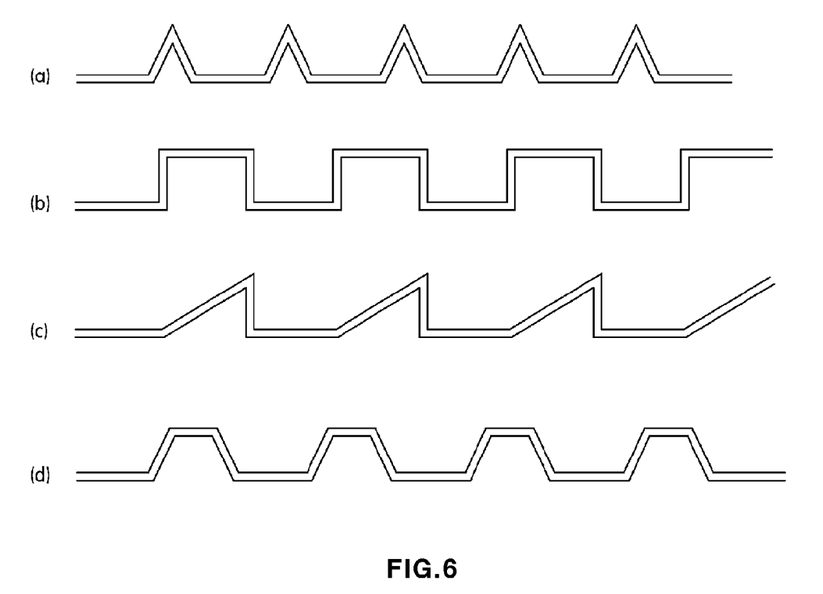
Figure 7:
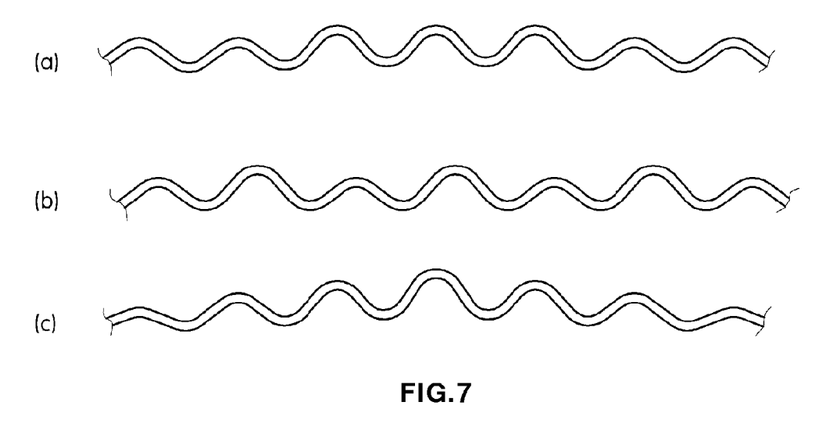
Figure 8:
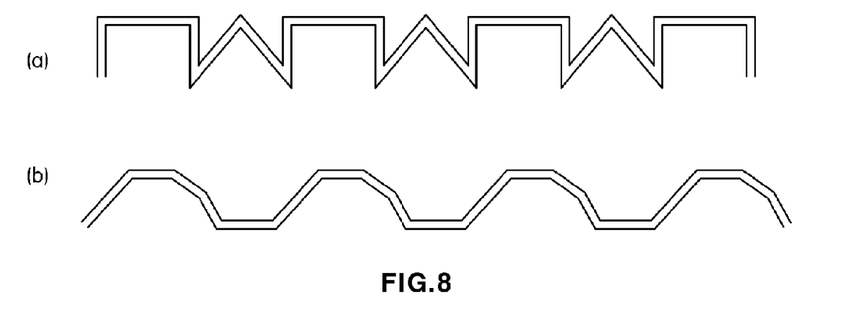

At this point, as shown in FIGS. 3 and 4, the exterior material 120 is provided with a pattern 124 for contraction and relaxation on at least one surface of the exterior material 120, and at least a portion of the pattern 124 includes a pattern configured to facilitate contraction and relaxation against a distortion direction of the exterior material 120.

That is, when the exterior material 120 is bent, the pattern 124 may include a first pattern part 124a for contraction and relaxation against the length direction of the exterior material 120, and a second pattern part 124b for contraction and relaxation against the distortion direction of the exterior material 120.

At this point, the first pattern part 124a and the second pattern part 124b are respectively formed to have a mountain part and a valley part, which are repeatedly disposed along the length direction of the exterior material 120, and are formed in a different direction with each other.

By describing in detail, a mountain part and a valley part of the first pattern part 124a are formed to be in parallel with a straight line which is in parallel with the width direction of the exterior material 120, and a mountain part and a valley part of the second pattern part 124b are formed to be inclined by a predetermined angle with respect to the straight line which is in parallel with the width direction of the exterior material 120.

Here, the second pattern part 124b is formed to be inclined in a direction the same as that in which the exterior material 120 is distorted. At this point, adjacent mountain part and valley part of the second pattern part 124b may be formed to be in parallel with each other (See, FIGS. 4(a), 4(b), 4(c), 4(e), and 4(f)), and a gap between adjacent mountain parts or valley parts may be formed to be gradually wider from one end to the other end (See, FIG. 4(d)).

In addition, gaps between adjacent mountain parts and valley parts of the second pattern part 124b may be respectively formed to have the same gap, to have a different gap, and to have a combination form of the same gap and the different gap.

Consequently, when being bent, the flexible battery 100 according to one embodiment of the present disclosure is easily contracted and relaxed against the length direction through the first pattern part 124a, and against the distortion direction through the second pattern part 124b.

As a result, even when the exterior material 120 is repeatedly bent against the length direction and/or the distortion direction while being used, a fatigue degree, which is applied to the exterior material 120 itself, may be reduced, and further the electrode assembly 110, which is disposed inside the exterior material 120, may also be protected from a weight which is generated when being bent.

Figure 11:
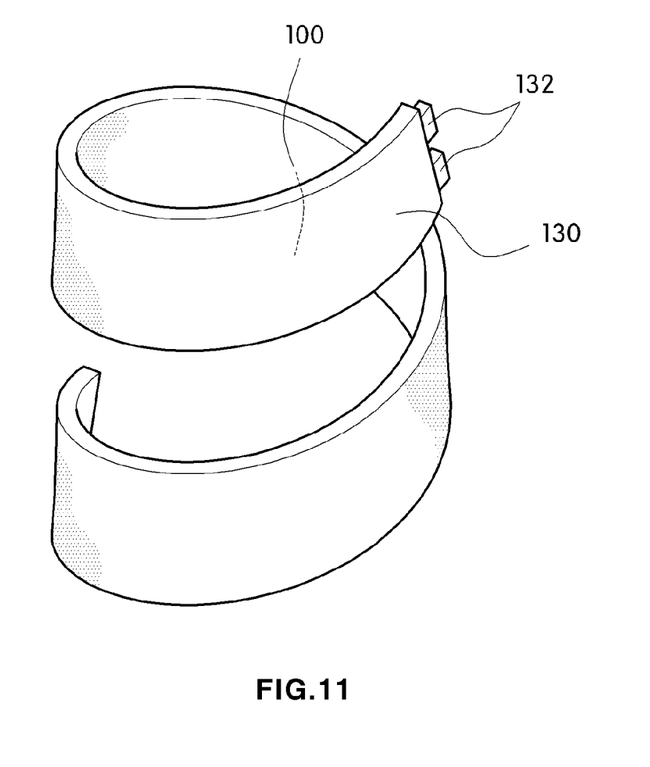
FIG. 11 is a schematic diagram illustrating a state in which the flexible battery according to one embodiment of the present disclosure is wound.
Figure 12:
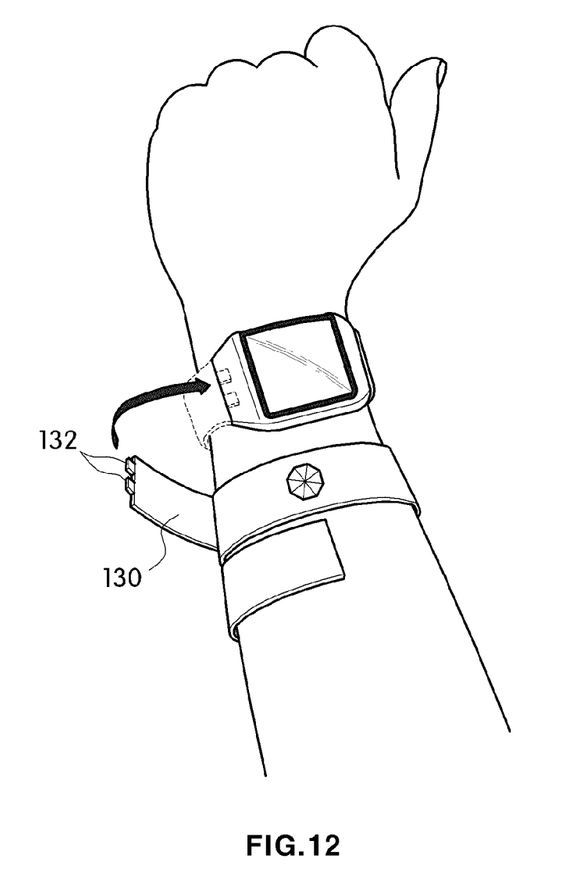
FIG. 12 is a usage state diagram of FIG. 10.

Therefore, as shown in FIGS. 11 and 12, the flexible battery 100 according to one embodiment of the present disclosure may have a length much more longer than that of the conventional flexible battery. This enables that, even when the flexible battery 100 is wound over a single turn while being stored, carried, or worn on a portion of a human body, it may not be overlapped with each other and a portion of the flexible battery 100 may be bent through contraction and relaxation against the distortion direction by virtue of the second pattern part 124b such that the flexible battery 100 may be easily wound without damage due to distortion.

Also, the pattern 124, which is formed at the exterior material 120, may be formed with only the second pattern part 124b of the first pattern part 124a and the second pattern part 124b (See, FIGS. 4(b) and 4(e)), and the second pattern part 124b may be disposed to be located between the first pattern parts 124a (See, FIGS. 4(a), 4(c), and 4(d)).

Additionally, the pattern, which is formed at the exterior material 120, may be entirely or partially formed at a surface of the exterior material 120.

Meanwhile, the electrode assembly 110 may be provided in a flexible plate-shaped form, but, similar to the exterior material 120, a pattern the same as the pattern 124, which is formed at the exterior material 120, may be provided at the electrode assembly 110 for the purpose of contraction and relaxation when the electrode assembly 110 is bent.

That is, for the purpose of contraction and relaxation when the cathode 112, the anode 116, and the separator 114, which configure the electrode assembly 110, are bent, a pattern 119 the same as the pattern 124, which is formed at the exterior material 120, may be provided at the electrode assembly 110.

Here, as shown in FIG. 4, the pattern 119 formed at the electrode assembly 110 may be configured with a first pattern part 119b formed to be in parallel with a straight line, which is in parallel with the width direction, and a second pattern part 119b formed to be inclined by a predetermined angle with respect to the straight line, which is in parallel with the width direction, may be configured with only the second pattern part 119b, and may be configured with a combination form of the first pattern part 119a and the second pattern part 119b. However, it may be permissible when the pattern 124 formed at the exterior material 120 and the pattern 119 formed at the electrode assembly 110 are matched to each other.

Additionally, as shown in FIGS. 5 to 8, the patterns 119 and 124 are respectively configured with mountain parts and valley parts which are continuous or discontinuous, a cross-sectional shape of each of the mountain part and the valley part may be formed with one or more kinds of patterns selected from a straight line pattern, a prism pattern, a half-circle pattern, a wavy pattern, a polygonal pattern, and a mixed pattern thereof.

Figure 10:
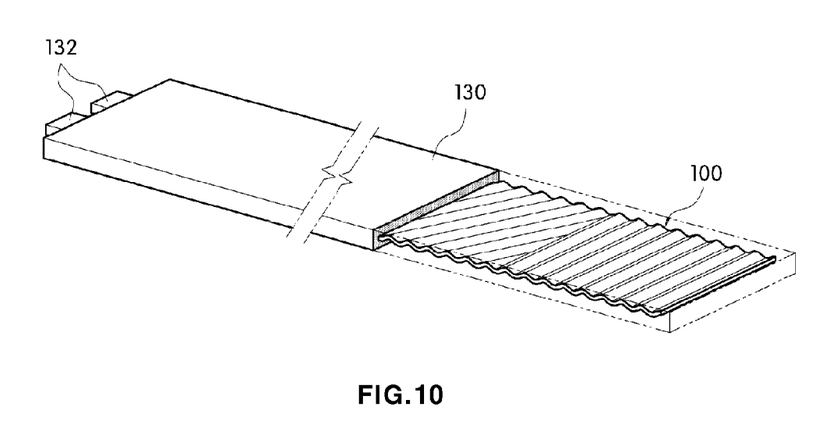
FIG. 10 is an entire schematic diagram illustrating a state in which a housing is applied to the flexible battery according to one embodiment of the present disclosure.

Meanwhile, as shown in FIGS. 10 to 12, the flexible battery 100 according to one embodiment of the present disclosure may include a housing 130 configured to cover the surface of the exterior material 120, and the housing 130 may be provided with at least one terminal part 132 configured to electrically connect to an external device.

At this point, the housing 130 may be configured with a flexible soft material.

Therefore, the flexible battery 100 according to one embodiment of the present disclosure may be implemented in an accessory form including a bracelet or an ankle bracelet, or in a watch strap form, and thus it may be used as a fashion article when the external device is not required to be charged, and may be connected to the external device through the terminal part 132 when the external device is required to be charged such that the flexible battery 100 may be conveniently used as an auxiliary battery regardless of location.

Here, although the terminal part 131 has been shown to be provided at an end part of the housing 130, it is noted that a formation position of the terminal part 131 is not specifically restricted.

As one example, it is noted that the terminal part 132 may be provided at a lateral part of the housing 130, and further it may be provided at an upper surface or a lower surface thereof. In addition, the terminal part 131 has been shown to be provided in a pair, but it is not limited thereto, and it is permissible that the terminal part 131 may have a form which is electrically connected to an electronic device through a coupling therewith as a known universal serial bus (USB) type.

The flexible battery 100 according to one embodiment of the present disclosure may be provided with a pattern for contraction and relaxation against a direction in which an exterior material is distorted and thus a crack may be prevented from being generated due to distortion such that an entire length of the flexible battery 100 may be increased.

Also, the flexible battery 100 of the present disclosure may be applicable to a secondary battery, which includes a lithium-ion polymer battery, an electric double layer capacitor, and a pseudo capacitor, as well as a lithium-ion secondary battery, and preferably, to a compact lithium-ion secondary battery.

In addition, it is noted that the flexible battery of the present disclosure may be used as a battery of an electrical and/or electronic device requiring flexibility, and it may be widely used in a watch strap of a smart watch, a portable electronic device including a flexible display device, and the like.

Hereinbefore, although one embodiment of the present disclosure has been described, the spirit of the present disclosure is not limited to the embodiment disclosed herein, and it should be understood that numerous other embodiments can be devised by those skilled in the art that will fall within the same spirit and scope of this disclosure through addition, modification, deletion, supplement, and the like of a component, and also these other embodiments will fall within the spirit and scope of the present disclosure.

The invention claimed is:

1. A flexible battery comprising:
   an electrode assembly; and
   an exterior material having a pattern, which is formed on at least one surface of the exterior material, for contraction and relaxation when the flexible battery is bent, and configured to encapsulate the electrode assembly together with electrolyte,
   wherein the pattern includes a first pattern part for contraction and relaxation against a length direction of the exterior material when the flexible battery is bent and a second pattern part for contraction and relaxation against the distortion direction of the exterior material,
   wherein a mountain part and a valley part of each of the first pattern part and the second pattern part are formed to be repeatedly disposed along the length direction of the exterior material, the mountain part and the valley part of the first pattern part are formed to be in parallel with a straight line which is in parallel with a width direction of the exterior material, and the mountain part and the valley part of the second pattern part are formed to be inclined by a predetermined angle with respect to the straight line which is in parallel with the width direction of the exterior material, and
   wherein the second pattern part is formed to be inclined in a direction the same as that in which the exterior material is distorted, and is disposed to connect to the first pattern parts which are respectively formed at a different position with each other.

2. The flexible battery of claim 1, wherein adjacent mountain parts or valley parts of the second pattern part are formed to be in parallel with each other.

3. The flexible battery of claim 1, wherein a gap between adjacent mountain parts or valley parts of the second pattern part is formed to be gradually wider from one end to the other end.

4. The flexible battery of claim 1, wherein the electrode assembly includes a cathode in which a cathode active material is disposed at one surface or both surfaces of a cathode current collector, an anode in which an anode active material is disposed at one surface or both surfaces of an anode current collector, and a separator, and
   the cathode, the anode, and the separator are respectively provided with a pattern the same as the pattern of the exterior material for contraction and relaxation when the flexible battery is bent.

5. The flexible battery of claim 4, wherein the separator includes a nanofiber web layer containing a polyacrylonitrile nanofiber at one surface or both surfaces of a nonwoven fabric layer.

6. The flexible battery of claim 1, wherein the pattern is formed to be continuous or discontinuous, and includes one or more among a prism pattern, a half-circle pattern, a wavy pattern, a polygonal pattern, an embossed pattern, and a mixed pattern thereof.

7. The flexible battery of claim 1 further comprising:
   a soft housing configured to cover a surface of the exterior material,
   wherein the soft housing is provided with at least one terminal part configured to electrically connect to an external device.

8. The flexible battery of claim 1, wherein the pattern for contraction and relaxation against the distortion direction of the exterior material is entirely or partially formed at a surface of the exterior material.

* * * * *